United States Patent Office 3,616,607
Patented Nov. 2, 1971

3,616,607
SEPARATION OF NITROGEN AND METHANE CONTAINING GAS MIXTURES
Donald L. Klass, Barrington, and Carl D. Landahl, Chicago, Ill., assignors to Northern Natural Gas Company, Omaha, Nebr.
No Drawing. Filed Apr. 6, 1970, Ser. No. 26,129
Int. Cl. B01d 59/10
U.S. Cl. 55—16
10 Claims

ABSTRACT OF THE DISCLOSURE

A membrane diffusion process for selectively permeating nitrogen from a methane-nitrogen containing mixture to obtain enriched separated fractions.

---

This invention relates to a membrane diffusion process for the conversion of nitrogen-methane gas mixtures into separate fractions wherein each fraction can be upgraded to contain substantially nitrogen or methane.

The permeation of gases through membranes has been the subject of various studies, but teachings relating to permeating gas mixtures through membranes for purposes of separation has not been extensive. It is difficult to prescribe or extrapolate data based on the permeation of separate gases to the corresponding mixture of such gases. The combination of two or more gaseous components may not behave in the expected manner because of the interactions of the gases, or because of the interaction of the gas mixture and a given membrane system, or both. Separating or upgrading a mixture of methane and nitrogen is especially important because some supplies of natural gas contain undesirable levels of nitrogen. There has been no disclosure relative to operable separating factors in membranes for nitrogen and methane gas mixtures. Serious problems confront any attempt to predict the success or the extent of separating a particular gas mixture. Such difficulty is attributable, in part, to the characteristics of membrane permeability by gas mixtures.

The more current views of membrane theory postulate that permeability of a gas through a membrane comprises two features, solubility of the gas in the membrane material and diffusion of gas through a membrane. Permeation of a single gas has therefore been viewed as being the product of the solubility and diffusivity of a given gas in the membrane. Each gas has a particular permeability constant for a given membrane. The rate of permeation of that gas is, however, influenced by other variables, such as membrane thickness, nature of the membrane, layers of the membrane involved, differential pressures, temperature, etc. These variable factors are further complicated in a very pronounced manner when gas mixtures are presented to a permeable membrane, as distinguished from a single gas. It has become recognized that permeability of a particular gas through a specific membrane may be changed by the plasticizing effect of the other gaseous components passing through the membrane. One gas can affect the permeation of the other, one gas can modify the plasticizing effect on the membrane of the other, and the like. Thus, it is difficult to predict the properties of a gas mixture and a particular membrane or membrane system. See, for example, N.N.L., "Industrial Enginering Chemical Products Research Development," No. 8, pp. 281–286.

It is an important object of the present invention to provide a method whereby a gas mixture containing methane and nitrogen can be effectively upgraded to contain substantially only one said gas by the improved procedure of selective permeation of the mixture through selected membranes or membrane assemblies. It is a feature of this object to provide a method wherein gas mixtures containing methane and nitrogen are effectively separated by passing the mixtures through a membrane system which includes, at least in part, a homopolymer of acrylonitrile. A still further feature of this object is that certain structural assemblies which employ such a type of membrane can be used to advantage for separation, as well as the discovery that a type of this membrane can be used successfully for effective separation.

It is another important object to provide a method whereby substantially pure methane may be obtained from a mixture containing a major amount of methane and a minor amount of nitrogen. This relatively pure methane may be obtained from a mixture having a substantial but minor amount of nitrogen, say, up to about 20% by volume. One available natural source of nitrogen and methane mixture contains about 13 volume percent nitrogen and 87 volume percent methane. The upgraded methane from this mixture may contain only trace amounts of nitrogen, say, less than 1 volume percent.

It is yet another important object to provide a method for separating methane and nitrogen containing mixtures by introducing said mixture to a homopolymer of acrylonitrile membrane having a high separation factor for methane and nitrogen, particularly a high permeation selectively for nitrogen. A feature of this object includes providing a membrane system where one layer is said homopolymer of acrylonitrile, and another layer is a support layer permeable to the gases in the mixture. The support layer may be porous, or may be a polymer support having a high permeation relative to said homopolymer of acrylonitrile which, in turn, has a high separation factor relative to the support layer. Other features of this object include providing the membrane or membrane system in various geometric forms; utilizing one or more diffusion stages in a batch or continuous process; and recycling the permeated and rejected gases through the same or partially same diffusion process.

Some separation or upgrading can be obtained to modest levels of success with various membranes such as cellulosics, silicone rubbers, natural rubbers, and others. The separation with such membranes, however, is not practically effective, usually because the ethane does not permeate at the desired selectivity. It has been discovered, however, that a markedly successful separation can be attained with a homopolymer of acrylonitrile membranes. These membranes are uniquely adapted for successful separation because nitrogen permeates through such membranes at high rates relative to methane. This is a pronounced advantage when desiring to upgrade gas mixtures containing a major amount of methane, but only a minor amount of nitrogen.

Polyacrylonitrile membranes of the type described in U.S. Pat. No. 3,172,741 have now been discovered to possess the unique selectivity for gas mixtures containing a nitrogen and methane. The highly operable membrane materials have been found to essentially consist of homopolymers of acrylonitrile. Successful polyacrylonitrile membrane materials are available under the trade designation Vistron 331 from the Vistron Corporation, subsidiary of Sohio. A true homopolymer or acrylonitrile may be prepared by the methods disclosed in abandoned U.S. patent application, Ser. No. 740,140, identified in issued U.S. Pat. No. 3,172,741.

The teaching of this cited patent states that biaxial orientation is required for separation of gas mixtures other than the gas mixtures concerned within the present invention. It is representative of the unique features characterizing the separation of gas mixtures through membrane permeation that high nitrogen and methane separation factors are attained with acrylonitrile homopolymers which are not biaxially oriented.

It has further been discovered that very thin layers of polyacrylonitrile membrances are of importance in separation; particularly, it is required that the very thin layer be a homopolymer of acrylonitrile. In general, the term, "thin layer" is intended to represent layers having a thickness not greater than about 0.5 mil. Successful separation may be obtained with a polyacrylonitrile membrane having a thicker dimension, say, up to about 10 mils, but is preferred to employ the thin layer on a support or in combination with other polymeric membranes.

Different structural forms in combination have been employed using polyacrylonitrile alone or with other polymeric membranes. For example, bilayers have been used of polyacrylonitrile with dimethyl silicone rubber, polyethylene, polytetrafluoroethylene, and still others. In such bilayers, the polyacrylonitrile is present as a thin layer, generally less than about 1 mil thick, and the other polymeric support layer can be 10 mils or more in thickness. Separate membranes may be joined in face-to-face relationship, or the polymeric layer may include a grafted homopolymer of acrylonitrile. For example, an organosol of dry polymer powder may be formed in a solvent system such as mixed dimethylsulfoxide and ethyleneglycol, followed by casting. The thickness of the cast film will depend on solids content and area of the desired membrane, see also, Rogers, C. E., "Journal of Polymeric Science," Part C, No. 10, pp. 93–102.

Two essentially separated film layers may be obtained by successively casting one layer on another which has previously been cured. Two or more membranes may also be formed in a laminar structure by compressing a stack of membranes under elevated temperature and pressure. It is also intended that bilayers may include a copolymer of acrylonitrile in one layer, and a homopolymer of acrylonitrile in the other layer, the copolymer being thicker than the homopolymer. It is only essential that one layer be a homopolymer of acrylonitrile, but it need not be biaxially oriented.

The membrane may be formed in various structures or configurations, such as a coil through which a continuous stream of nitrogen and methane is moved. The nitrogen will permeate through the coil member so that enriched methane passes out of the coil membrane at its outlet. Films of membranes may also be employed, such as sheets, which are supported in diffusion cells, for example. In such cells, bilayers or multilayers are clamped between two halves with spaces defined on opposite sides of the membrane. The feed gas mixture is introduced under pressure on one side of the membrane in the space, and various conduits may communicate with the spaces on the opposite sides to remove separated gas components. Some of the conduits may have pressure valve controls, and pressure measuring means. Other structural forms will occur to practitioners.

The gas mixture feed stream can be passed through one diffusion stage or a plurality of such stages. Each stage may comprise a membrane or membrane system in a particular geometric form, such as a coil, pipe, tube or film sheet. The feed stream may be continuously passed through one or more of these stages so that either the rejected methane component or the lower pressure permeated nitrogen component is continuously upgraded. Further, the rejected methane enriched stream may be recycled through the same diffusion process to further upgrade the methane and reduce the nitrogen component through permeation. Likewise, the permeated enriched nitrogen stream may be recycled to further upgrade the stream through permeation of the nitrogen and rejection of the methane.

The gas mixture may consist essentially of methane and nitrogen, or may include other gaseous components. The process may be used with mixtures containing varying amounts of nitrogen, up to about 50% by volume relative to the methane. The method is particularly useful with mixtures containing minor amounts of nitrogen, however, because of the high selectivity of the membrane used for nitrogen. Such a high separation factor of the membrane facilitates effective separation or upgrading of mixtures containing smaller amounts of nitrogen.

By way of representative teaching, a cylinder gas from the Matheson Company is delivered in a continuous flow for separation by permeation through a membrane. The gas has the following composition:

COMPOSITION OF MATHESON COMPANY CYLINDER GAS

| Component: | Mixture, percent |
|---|---|
| Methane | 81.8 |
| Ethane | 0.096 |
| Propane | 0.013 |
| Butane | 0.001 |
| Nitrogen | 18.1 |
| Carbon dioxide | 0.008 |
| Helium | 0.006 |

The above gas mixture is permeated through different membranes and membrane assemblies of two or more layers. The amount of gas permeated may be expressed in different ways. In general, it is the amount of permeate which passes through a given area of membrane, of given thickness over a given time period. The steady state permeation process can be described by a form of Fick's law:

$$q = \frac{KA(\Delta P)}{\delta}$$

$q$ = flow rate through membrane, cm.$^3$ (STP)/sec.
$K$ = permeability constant $$\frac{cm.^3 (STP) cm.}{cm.^2 \; sec. \; cm. \; Hg}$$

$A$ = membrane area, cm.$^2$
$\Delta P$ = pressure differential of specific gas across the membrane, cm. Hg
$\delta$ = thickness of membrane, cm.

The permeability constant K is a quantity determined for a particular membrane ssytem and permeate.

The permeability constant may be measured, for example, by a solubility-diffusivity or a constant volume-constant pressure method. A diffusion cell is used for both methods, wherein a membrane system is clamped between two halves of a diffusion cell. A space is defined on each side of the membrane in the cell and various communicating conduits introduce gases, are vented to atmosphere, measure pressures, and the like. In the constant volume-constant pressure method, pressures on the input and output sides are essentially constant. The output side has an inert gas pressure of about one atmosphere lower than the input pressure. The sum of the partial pressures of the permeated gases is not permitted to exceed 10% of the total input pressure before samples are removed for analysis by mass spectrometry.

In the solubility-diffusivity method, the membrane is saturated with a test gas mixture, which is then rapidly removed from the oven surrounding the membrane. The gas which effuses from the membrane is removed and analyzed, with time, by mass spectrometry. See Crank, J. and Park, G. S., Diffusion in Polymers, 16 London: Academic Press, 1968.

The separation factor, which is a measure of the separating efficiency of the combination of the gas mixture and the membrane, is expressed as the ratio of the permeability factor of one gas to another gas, or $$\alpha_{1/2} = \frac{K_1}{K_2}$$

The two methods which can be employed present the following relationships for determining permeability.

I Constant volume—Constant pressure $$\alpha_{1/2} = \frac{K_1}{K_2} = \frac{\delta V_1/tA\Delta p_1}{\delta V_2/tA\Delta p_2} = \frac{V_1 \Delta p_1}{V_2 \Delta p_2}$$

$a_{1/2}$ = Separation factor
$K_1$ = Permeability of Gas 1
$K$ = Permeability of Gas 2
$\delta$ = Membrane Thickness
$V_1$ = Mole percent of Gas 1 permeated at STP
$V_2$ = Mole percent of Gas 2 permeated at STP
$t$ = Time
$A$ = Mebrane area
$\Delta p_1$ = Partial pressure differential of Gas 1
$\Delta p_2$ = Partial pressure differential of Gas 2

II Solubility—Diffusivity $K = SD$
$K$ = Permeability $$\frac{cm.^3 (STP) cm.}{cm.^2 \ sec. \ cm. \ Hg}$$

$S$ = Bunsen solubility $$\frac{cm.^3 (STP)}{cm.^3 \ (polymer) \ cm. \ Hg}$$

$D$ = Diffusivity, $cm.^2/sec.$

The following Table 1 shows some separation factors, experimentally determined with a mixture of 18 volume percent nitrogen and 82 volume percent methane, for representative membrane systems.

TABLE 1.—NITROGEN-METHANE PERMEATED THROUGH SELECTED MEMBRANES

Feed gas—18 vol. percent $N_2$, 82 vol. percent $CH_4$

|  | Composition of permeated gas | |
| --- | --- | --- |
|  | Vol. percent $N_2$ | Vol. percent $CH_4$ |
| Polyethylene | 7 | 93 |
| Polyvinylchloride | 7 | 93 |
| Polytetrafluoroethylene (Teflon TFE) | 32 | 68 |
| Polyacrylonitrile, homopolymer | 69 | 31 |

Vistron 331 membrane permeation was measured by the solubility-diffusivity method, and the other membrane systems were measured using the constant volume-constant pressure method. Film structure systems were used for the polyacrylonitrile forms, and coil structures were used for the other polymeric membrane systems. It is seen that the separation factor for the polyacrylonitrile membrane systems is many times greater than for the other polymeric membrane systems.

TABLE 2.—COMPARISON OF BILAYER MEMBRANES FOR SEPARATION OF NITROGEN AND METHANE

| Membrane | Membrane M | Thickness ratio $M_1/M_2$ | Separation factor $N_2/CH_4$ |
| --- | --- | --- | --- |
| Polyacrylonitrile | None |  | 16 |
| None | Polyethylene |  | [1] 1.7 |
| Polyacrylonitrile | do | 0.0001 | 9.6 |
| Do | do | 0.001 | 15 |
| Do | do | 0.01 | 15.9 |
| Do | do | 0.1 | 16 |
| None | Dimethyl silicone rubber |  | 0.3 |
| Polyacrylonitrile | do | 0.00001 | 15 |
| Do | do | 0.0001 | 15.9 |
| Do | do | 0.001 | 16 |

[1] This polyethylene membrane is of different density than the membrane listed in Table I.

The separation factor values are the permeability ratios of the two gases through the membrane system, such factors being determinable by the constant volume-constant pressure method, the solubility-diffusivity method, or by other methods.

The foregoing Table 2 shows how various bilayer membrane systems may be employed with good separation. Preferably the polyacrylonitrile membrane which is used should be of very thin dimensions, say, less than about 1 mil, preferably 0.5 mil or less.

In general, a bilayer system will have a supporting polymer layer which will be relatively thick and have a high permeation rate but a low separation factor. The other layer will be a very thin homopolymer of acrylonitrile which has a low permeation rate, but a high separation factor. A porous support membrane may also be used, such as porous stainless steel, but the permeation rate of the support is not then a consideration because of the porosity. In bilayer systems wherein permeation rate is a consideration, the thickness dimensions of the homopolymer of acrylonitrile and the supporting polymer are selected to realize the best permeation rate and separating factor combinations. Those skilled in this art will readily know how to ascertain such a combination.

Claims for the invention are now presented.
What is claimed is:

1. A process for upgrading a gas mixture containing methane and nitrogen to enriched separate fractions which includes the steps of
    delivering the gas mixture in a stream to one side of a permeable membrane system which includes at least a homopolymer of acryonitrile membrane having a thickness less than about 1 mil,
    allowing said nitrogen to permeate the membrane system to provide permeated enriched nitrogen, and
    recovering rejected enriched methane on said one side of said membrane system.

2. A process which includes the steps of claim 1 above, wherein said gas mixture consists essentially of a major amount of methane and a minor amount of nitrogen.

3. A process which includes the steps of claim 1 above, wherein said membrane system is a multi-layered system including about a one-half mil thick membrane layer of a homopolymer of acrylonitrile, and an adjoining polymeric support layer of substantially thicker dimension, said polymeric support layer having a higher permeation rate for the gas mixture but a low separation factor relative to said homopolymer of acrylonitrile.

4. A method which includes the steps of claim 1 above, wherein said membrane is in the form of a coil, said gas mixture is delivered in a stream inside the coil, nitrogen enriched gas permeates through the membrane of the coil, and said rejected enriched gas continuing in its path inside the coil to an outlet where it is collected.

5. A method which includes the steps of claim 3 above wherein said polymeric support layer is silicone rubber, and wherein the thickness ratio of the homopolymer of acrylonitrile to the silicone rubber is from about 0.00001 to about 0.001.

6. A process which includes the steps of claim 3 above, wherein the polymeric support layer is polyethylene, and the thickness ratio of the homopolymer of acrylonitrile to the polyethylene is from about 0.0001 to about 0.1.

7. A process which includes the steps of claim 3 above, wherein the multilayer system is prepared by grafting the poly-acrylonitrile membrane to a polymeric support layer by casting a liquid charge of acrylonitrile homopolymer onto the support layer, said charge having a solid content so that the area covered by the charge leads to a homopolymer acrylonitrile membrane having a thickness of up to about one-half mil.

8. A process which includes the steps of claim 3 above, wherein the multilayer system is formed by applying a thin layer of a homopolymer polyacrylonitrile membrane to the polymeric support layer, and bonding the homopolymer acrylonitrile membrane to the polymeric support layer.

9. A method which includes the process steps of claim 3 above, wherein said multilayer system is formed by applying a membrane layer of homopolymer acrylonitrile to the polymeric support layer, and fusing the layers by application of heat.

10. A method which includes the steps of claim 1 above, wherein said homopolymer of acrylonitrile membrane is selected from the class consisting of biaxially oriented homopolymer of acrylonitrile and non-biaxially oriented homopolymer of acrylonitrile.

References Cited

UNITED STATES PATENTS

| | | | |
|---|---|---|---|
| 2,617,493 | 11/1952 | Jones | 55—16 |
| 3,172,741 | 2/1965 | Jolley | 55—16 |

REUBEN FRIEDMAN, Primary Examiner

C. N. HART, Assistant Examiner